United States Patent
Honjo

Patent Number: 5,379,120
Date of Patent: Jan. 3, 1995

[54] OPTICAL DISK APPARATUS FOR SELECTIVELY RECORDING AND REPRODUCING SIGNALS HAVING DIFFERENT BIT RATES

[75] Inventor: Masahiro Honjo, Sakai, Japan

[73] Assignee: Matsushita Electric Industrial Co., Ltd., Osaka, Japan

[21] Appl. No.: 65,362

[22] Filed: May 24, 1993

Related U.S. Application Data

[62] Division of Ser. No. 794,013, Nov. 19, 1991, Pat. No. 5,255,103.

[30] Foreign Application Priority Data

Nov. 20, 1990 [JP] Japan .................... 2-317216

[51] Int. Cl.$^6$ ................................. H04N 5/84
[52] U.S. Cl. ................................. 358/342; 358/310; 358/335
[58] Field of Search ............ 358/335, 342, 310; 360/33.1, 32; 369/32, 50, 120, 48

[56] References Cited

U.S. PATENT DOCUMENTS

| | | | |
|---|---|---|---|
| 4,963,991 | 10/1990 | Honjo | 358/310 |
| 5,065,259 | 11/1991 | Kubota et al. | 358/335 |
| 5,115,323 | 5/1992 | Tachibana et al. | 358/310 |
| 5,162,922 | 11/1992 | Takemura | 358/342 |
| 5,172,366 | 12/1992 | Chikuma | 369/120 |

Primary Examiner—Tommy P. Chin
Assistant Examiner—Huy Nguyen
Attorney, Agent, or Firm—Wenderoth, Lind & Ponack

[57] ABSTRACT

An optical apparatus digitizes a first signal, reproduce or records and reproduce the digital information compressed in a band up to a specified bit rate A1 at a specified rotating speed K or specified linear velocity V, digitizes a second signal, reproduces or records and reproduces the digital information compressed in a band up to a specified bit rate A2 at a rotating speed of about K×A2/A1, or a linear velocity of about V×A2/A1, and thereby reproduce or records and reproduces information of plural signals, or reproduces or records and reproduces information of plural compression rates by using only one apparatus. It also digitizes a first signal, reproduces or records and reproduces the digital information compressed in a band up to a specified bit rate A1 in n optical channels, digitizes a second piece of information, reproduces or records and reproduces the digital information compressed in a band up to a specified bit rate A2 in about n×A2/A1 optical channels, and thereby reproduces or records and reproduces information of plural signals, or reproduces or records and reproduces information of plural compression rates using only one apparatus without notably varying the rotating speed or linear velocity. It further enters the light emitted from a semiconductor laser into a nonlinear optical device (SHG), and reproduces the information on a disk surface or records and reproduces the information on a disk surface using the secondary harmonics delivered from the nonlinear optical device.

16 Claims, 4 Drawing Sheets

FIG. 5(A)

| SIGNAL | BIT RATE AFTER BAND COMPRESSION (Mbps) | LINEAR VELOCITY | NO. OF OPTICAL SYSTEM CHANNELS | TIME |
|---|---|---|---|---|
| NTSC | 5 | V | 1 | 12 T$_1$ |
| | 10 | V | 2 | 6 T$_1$ |
| | | 2 V | 1 | 6 T$_1$ |
| HD | 30 | 3 V | 2 | 2 T$_1$ |
| | | 6 V | 1 | 2 T$_1$ |
| | 60 | 6 V | 2 | T$_1$ |

FIG. 5(B)

| SIGNAL | BIT RATE AFTER BAND COMPRESSION (Mbps) | ROTATING SPEED | NO. OF OPTICAL SYSTEM CHANNELS | TIME |
|---|---|---|---|---|
| NTSC | 5 | K | 1 | 12 T$_2$ |
| | 10 | K | 2 | 6 T$_2$ |
| | | 2 K | 1 | 6 T$_2$ |
| HD | 30 | 3 K | 2 | 2 T$_2$ |
| | | 6 K | 1 | 2 T$_2$ |
| | 60 | 6 K | 2 | T$_2$ |

OPTICAL DISK APPARATUS FOR SELECTIVELY RECORDING AND REPRODUCING SIGNALS HAVING DIFFERENT BIT RATES

This is a divisional application of Ser. No. 07/794,013, filed Nov. 19, 1991, now U.S. Pat. No. 5,255,103.

BACKGROUND OF THE INVENTION

1. Field of the Invention

The present invention relates to an optical disk apparatus capable of reproducing or both recording and reproducing of signals which are greatly different in the frequency band from each other, such as an NTSC signal and a high definition television signal.

2. Description of the Prior Art

Optical disk apparatuses capable of reproducing or both recording and reproducing one of an NTSC signal and a high definition television signal have been distributed and reported hitherto. However, all of them are of the analog recording type and are optimally designed for individual signal bands, so that they are not compatible with each other. In the case of digital recording, the quantity of information is by far greater than that in the analog recording. Thus, it was not realistic to employ digital recording in the aspects of reducing the recording and reproducing time and extending the transfer rate. In other words, there was no optical disk apparatus capable of reproducing or both recording and reproducing both the NTSC signal and the high definition television signal. Even if the recording signals are of the same type, there was no optical disk apparatus capable of reproducing or both recording and reproducing in both a low-definition, long-playing mode at a high compression rate and a high-definition, short-playing mode at a low compression rate.

SUMMARY OF THE INVENTION

It is hence a primary object of the invention to provide a high recording density optical disk apparatus capable of reproducing or both recording and reproducing both a narrow band signal such as an NTSC signal and a wide band signal such as a high definition television signal, and capable of reproducing a signal in plural modes including a low-definition, long-playing mode at a high compression rate and a high-definition, short-playing mode at a low compression rate. Another object of the invention is to extremely raise the recording density by inserting a nonlinear optical device (SHG) into an optical system for reproducing or both recording and reproducing a signal by using secondary harmonics.

To achieve the above objects, in one aspect of the present invention, an optical disk apparatus is configured to digitizes a first signal, and reproduce or both record and reproduce a digital data compressed in a band down to a specified bit rate A1 at a specified disk rotating speed K or a specified linear velocity V, and, on the other hand, digitizes a second signal, and reproduce or both record and reproduce a digital data compressed in a band down to a specified bit rate A2 at a disk rotating speed of substantially $K \times A2/A1$ or a linear velocity substantially $V \times A2/A1$. With this configuration, it is possible to reproduce or both record and reproduce any one of a plurality of signals which are different from each other in frequency band or compression rate.

In another aspect of the present invention, an optical disk apparatus is configured to digitizes a first signal, and reproduce or both record and reproduce a digital data compressed in a band down to a specified bit rate A1 in n optical channels, and, on thee other hand, digitizes a second signal, and reproduce or both record and reproduce a digital data compressed in a band down to a specified bit rate A2 in substantially $n \times A2/A1$ optical channels. With this configuration, it is possible to record and/or reproduce any one of a plurality of signals which are different from each other in frequency band or compression rate without notably varying the disk rotating speed or linear velocity.

In still another aspect of the present invention, an optical disk apparatus maybe configured to enter a light emitted from a semiconductor laser into a nonlinear optical device (SHG), and reproduce data recorded on a disk surface or both record data onto and reproduce data from the disk surface by secondary harmonics outputted from the nonlinear optical device. With this configuration, it is possible to greatly increase the recording density.

BRIEF DESCRIPTION OF THE DRAWINGS

FIG. 5(A) and 5(B) are tables showing the relationship between the signal, mode and other parameters in an embodiment in accordance with the present invention.

DESCRIPTION OF THE PREFERRED EMBODIMENTS

Figure 1:
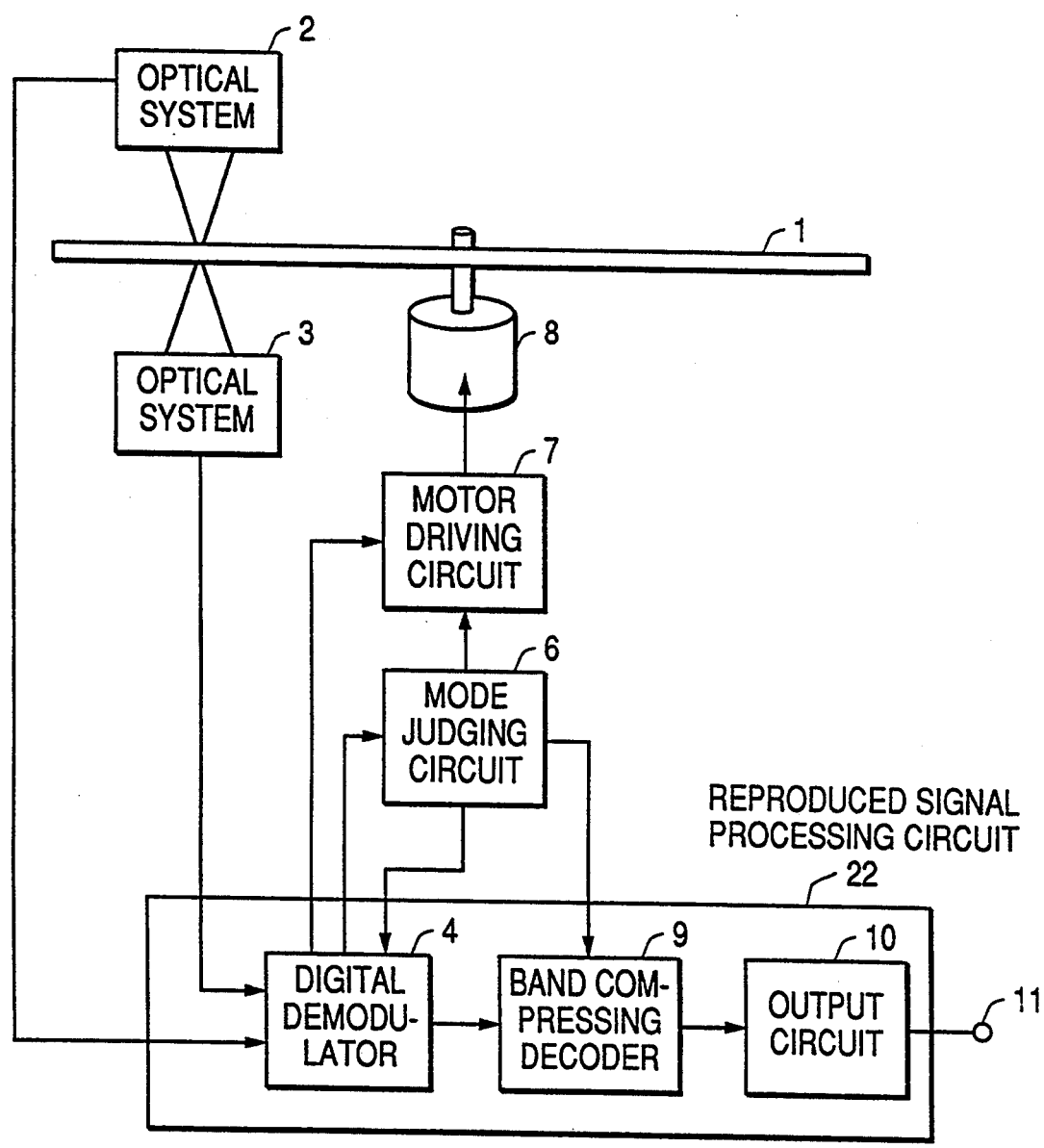
FIG. 1 is a block diagram of a reproducing system of an optical disk apparatus in accordance with the present invention.

FIG. 1 is an embodiment of a reproducing system of an optical disk apparatus in accordance with the present invention. Information recorded on an optical disk 1 is read by optical systems 2 and 3 including an optical head, and is sent into a digital demodulator 4. In the digital demodulator 4, the information is demodulated into a digital signal, and error correction or other processing is done at the same time. In a mode judging circuit 6, the type and mode of the signal of the reproduced information are judged from the information from the digital demodulator 4.

The output of the digital demodulator 4 is decoded by a band-compressing decoder 9 on the basis of the information from the mode judging circuit 8. The signal decoded and expanded in a band is digital-to-analog (D/A) converted in an output circuit 10, and delivered to an output terminal 11. A motor driving circuit 7 for controlling a motor 8 controls the motor 8 depending on the information from the digital demodulator 4 and mode judging circuit 6 so that the disk rotating speed or the linear velocity of the optical head relative to the disk becomes a specified value.

A reproduced signal processing circuit 22 is composed of the digital demodulator 4, band-compressing decoder 9, and output circuit 10.

If, meanwhile, the transfer rate is low, only one channel optical system 2 may be used and the optical system 3 may be omitted.

Here, the operation of the mode Judging circuit 6 is to control the motor 8 so that the linear velocity of the optical head relative to the disk becomes a specified value. Or it is to operate only a required channel of the optical system, which may be realized, for example, by selecting only the necessary information out of the input information in the digital demodulator 4.

Figure 2:
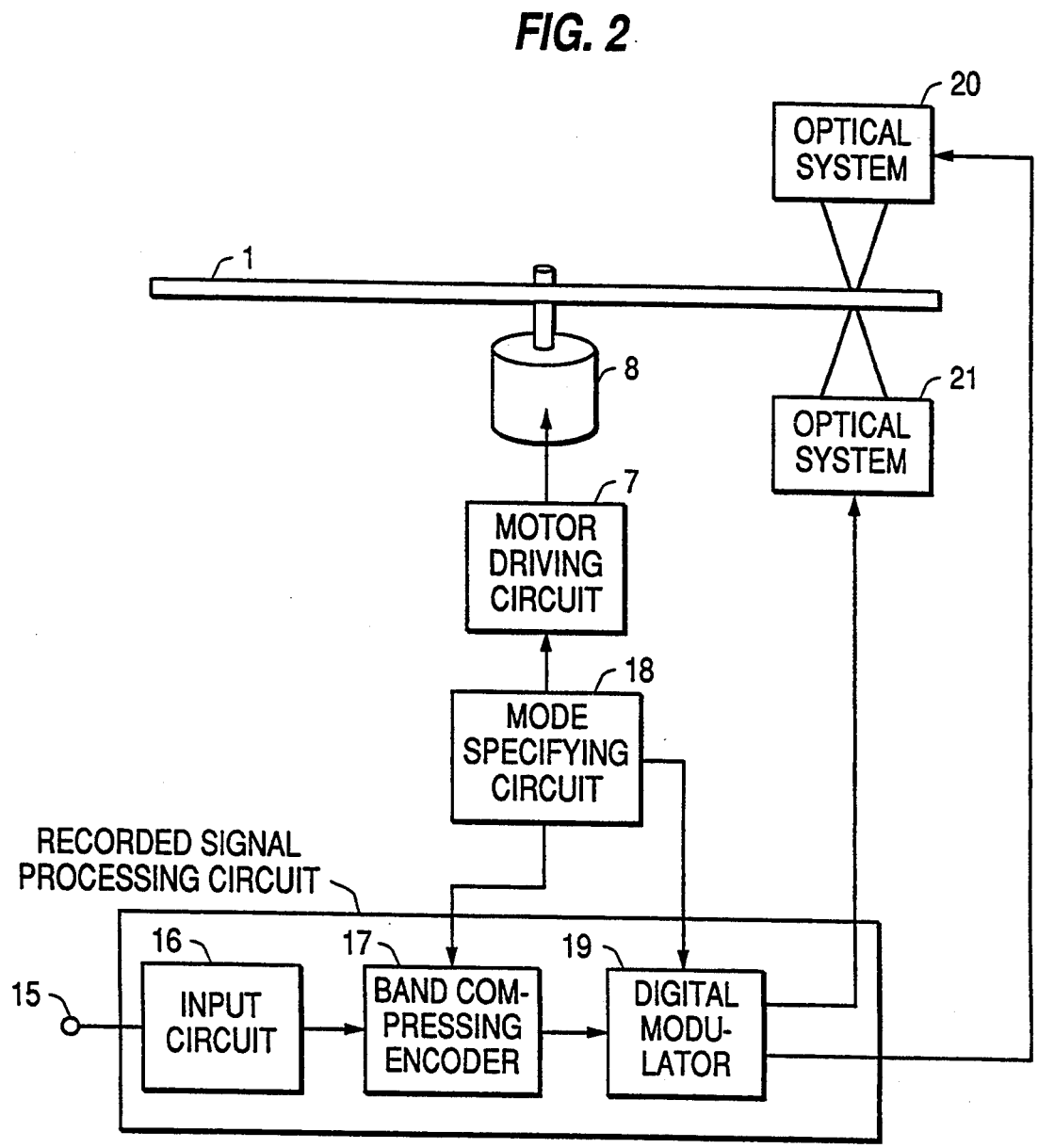
FIG. 2 is a block diagram of a recording system of an optical disk apparatus in accordance with the present invention.

In the case of a reproducing only machine, it is only necessary to have the reproducing system described above, but in the case of a recording and reproducing machine, a recording system is also needed. Referring then to FIG. 2, an embodiment of a recording system of an optical disk apparatus is explained. The common blocks as in FIG. 1 are identified by the same reference numbers.

A signal entered from an input terminal 15 is analog-to-digital (A/D) converted in an input circuit 16, and is encoded into a specified bit rate signal by a band-compressing encoder 17. This result is fed into a digital modulator 19 to be subjected to processing such as the addition of an error correction code, and is digitally modulated. Laser beams generated in optical systems 20 and 21 are modulated by the digital modulated signal, so that digital information is recorded on an optical disk 1. A motor 8 is controlled by a motor driving circuit 7 so as to achieve a specified rotating speed of the disk or a specified linear velocity of the optical head relative to the disk. A recorded signal processing circuit 23 is composed of the input circuit 16, band-compressing encoder 17, and digital modulator 19.

All of the motor driving circuit 7, digital modulator 19, and encoder 17 are controlled by the information from a mode specifying circuit 18 so as operate as specified. If it is enough operate with only one channel of the optical system in a low transfer rate application, the optical system 21 is not needed.

The mode specifying circuit 18 is to specify the mode by means of, for example, a switch operated by an operator.

Figure 3:
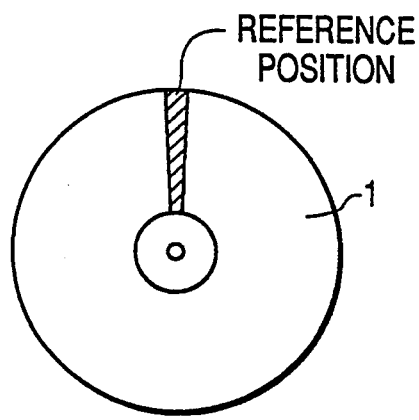
FIG. 3 is an example of a disk in accordance with the present invention.

As the mode judging method in the mode judging circuit 6 in reproduction, various methods may be considered including a method of, as shown in FIG. 3, recording a coded mode signal on a reference position of the disk, for example, a position on each track on a specific line in the radial direction, and Judging the mode by reproducing the mode signal from the reference position.

Figure 4:
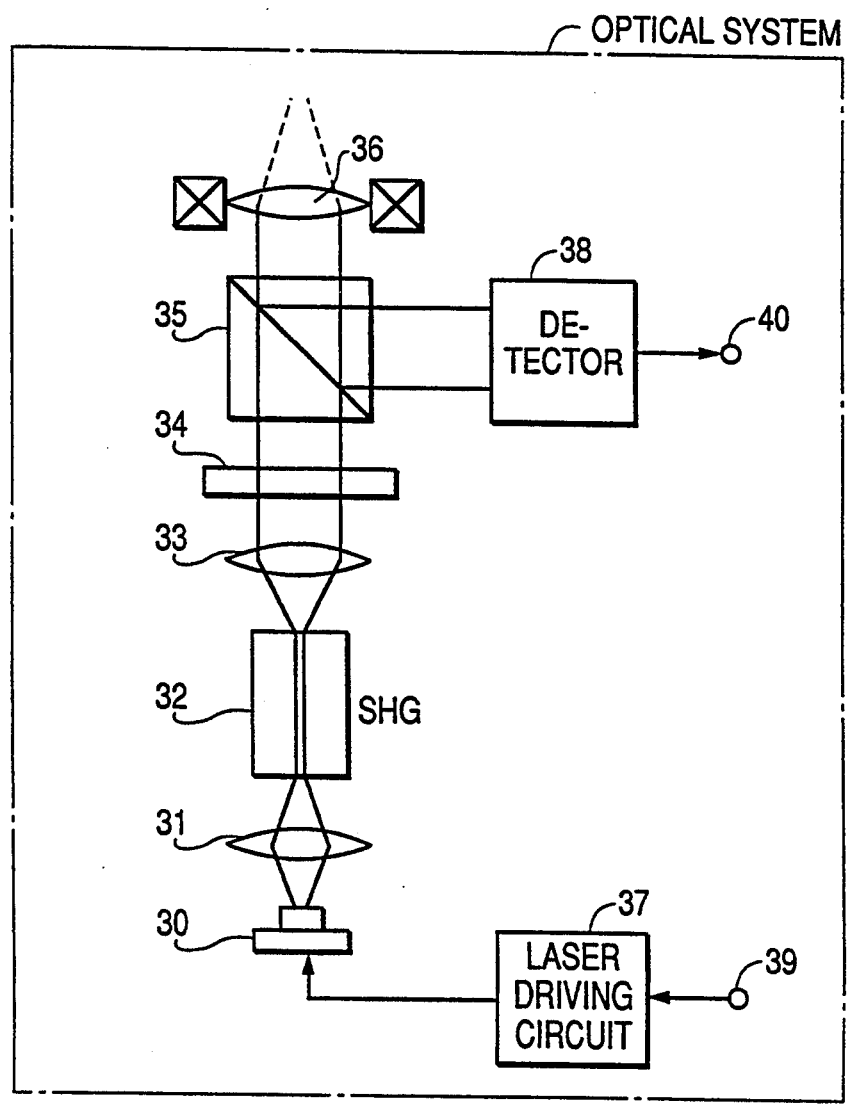
FIG. 4 is a block diagram of an optical system of an optical disk apparatus in accordance with the present invention.

The optical systems 2, 3, 20 and 21 are shown in detail in FIG. 4.

The optical system comprises a semiconductor laser 30, coupling lenses 31 and 32, a nonlinear optical device (SHG) 32, a long wavelength cut filter 34, a beam splitter 35, an objective lens 36, a detector 38, and a laser driving circuit 37. In recording, the modulation signal is fed into the laser driving circuit 37. In reproducing, a reproduced signal is delivered from the detector 38.

By inserting the SHG 32, the laser wavelength is divided in half so that the recording density on the disk can be increased by about four times. As the SHG 32, the waveguide type is desired when recording and reproducing, but when reproducing only, it may be either the waveguide type or the bulk type.

FIGS. 5(A) and 5(B) show an example of reproducing or recording and reproducing plural signals having different bands at plural compression rates, by using the thus composed optical disk.

This is to show the relationship of the linear velocity, number of optical system channels and reproduction time in CLV, and the relationship of the disk rotating speed, number of optical system channels and reproduction time in CAV, when the narrow band, NTSC signal is compressed in a band to 5 Mbps and 10 Mbps, and when the wide band, high definition television signal is compressed in a band to 30 Mbps and 60 Mbps.

In FIG. 5(A), the linear velocity is constant, and in FIG. 5(B), the disk rotating speed is constant. If, as shown, in FIG. 5(A), the linear velocity with an NTSC signal of 5 Mbps is V and the reproduction time is $12T_1$, then the linear velocity of an HD signal of 30 Mbps is 3V in a two-channel optical system, or 6V in a one-channel optical system, and the reproduction time is respectively $2T_1$. The same holds true in FIG. 5(B) where the disk rotating speed is constant.

In the same signals, the greater the bit rate after band compression, the shorter becomes the reproduction time and hence a picture of high quality is reproduced.

In the foregoing embodiments, the reproducing system and recording system are explained separately, but the invention is similarly applied either in the optical disk apparatus for recording and reproducing using only one unit or in the optical disk apparatus used for reproducing only.

Incidentally, the narrow band signals include the NTSC signal, PAL signal, SECM signal and so on, and the wide band signals include the HD signal, HDMAC signal, MUSE signal and the like.

Input and output signals may include, among others, composite signals, Y, PrPb, R, G, B, YC signals, audio signals, and control signals.

The mode judging circuit 8 may be designed to set by the operator by using a switch.

The optical system is not limited to two channels, but the number of channels may be increased as required.

The invention is valid not only in the CAV system and CLV system, but also in the MCAV system, MCLV system, and other disk driving systems.

What is claimed is:

1. An optical disc apparatus for recording a digital signal on a recording disk in a recording mode and for reproducing the recorded digital signal in a reproduction mode, comprising:

a recording signal processor, said processor in a first processing mode, compression-coding and modulating an input signal to obtain n channels of first modulated coded signals having a bit rate A1, wherein n is a positive integer at least equal to one, and, in a second processing mode, compression-coding and modulating the input signal to obtain substantially $n \times A2/A1$ channels of second modulated coded signals having a bit rate A2 which is higher than the bit rate A1;

a disk driver, said disk driver driving said recording disk to rotate at a specified substantially constant rotating speed or at a specified substantially linear velocity;

a mode specifier, said mode specifier controlling said recording signal processor in said recording mode to operate either in said first processing mode or in said second processing mode;

an optical recorder and reproducer having $n \times A2/A1$ recording/reproducing channels for recording on said recording disk said n channels of first modulated coded signals through n recording/reproducing channels of said n×A2/A1 recording/reproducing channels when said recording signal processor is operating in said first processing mode and for recording said n×A2/A1 recording/reproducing channels when said recording signal processor is operating in said second processing mode, and for reproducing from said recording disk the recorded n channels of first modulated coded signals through said n recording/reproducing channels to obtain n channels of reproduced first modulated coded signals having the bit rate A1 when signals to be reproduced are said first modulated coded signals and for reproducing the recorded n×A2/A1 channels of second modulated coded signals through said n×A2/A1 recording/reproducing channels to obtain substantially n×A2/A1 channels of reproduced modulated coded signals having the bit rate A2 when the signals to be reproduced are said second modulated coded signals;

a reproduced signal processor, said processor in a first processing mode, demodulating and decoding said n channels of reproduced first modulated coded signals to obtain a reproduced digital signal and, in a second processing mode, demodulating and decoding said substantially n×A2/A1 channels of reproduced second modulated coded signals;

a mode controller, said controller controlling said reproduced signal processing means to operate in said first operating mode when the signals to be reproduced are said first modulated coded signals and to operate in said second mode when the signals to be reproduced are said second modulated coded signals.

2. An apparatus according to claim 1, wherein said mode controller includes a detector, said detector detecting from a signal reproduced by said optical recorder and reproducer whether the modulated coded signals to be reproduced are said first modulated coded signals or said second modulated coded signals.

3. An apparatus according to claim 1, wherein each of said n×A2/A1 recording/reproducing channels of said optical recorder and reproducer includes a semiconductor laser for emitting a laser beam, and a non-linear optical element for generating a second harmonic component from the laser beam, and uses the second harmonic component for reproducing each of the n and n×A2/A1 channels of modulated coded signals from said recording disk.

4. An apparatus according to claim 1, wherein said mode specifier controls said recording signal processor to operate in said first processing mode and when the input signal is any one of an NTSC, PAL and SECAM signal and to operate in said second processing mode when the input signal is a high definition television signal having a wider frequency band than any one of the NTSC, PAL and SECAM signal.

5. An optical disc apparatus for reproducing a digital signal recorded on a recording disk in the form of either n channels of first modulated coded signals having a bit rate A1 and n×A2/A1 channels of second modulated coded signals having a bit rate A2 which is higher than the bit rate A1, said apparatus comprising:

an optical reproducer having n×A2/A1 reproducing channels, said reproducer reproducing from said recording disk the recorded n channels of first modulated coded signals through n reproducing channels of said n×A2/A1 reproducing channels to obtain n channels of reproduced first modulated coded signals having the bit rate A1 when signals to be reproduced are said first modulated coded signals and for reproducing the recorded n×A2/A1 channels of second modulated coded signals through said n×A2/A1 reproducing channels to obtain substantially n×A2/A1 channels of reproduced modulated coded signals having the bit rate A2 when the signals to be reproduced are said second modulated coded signals;

a reproduced signal processor, said processor, in a first processing mode, demodulating and decoding said n channels of reproduced first modulated coded signals to obtain a reproduced digital signal and, in a second processing mode, demodulating and decoding said substantially n×A2/A1 channels of reproduced second modulated coded signals to obtain another reproduced digital signal;

a driver, said driver driving said recording disk to rotate at a specified substantially constant rotating speed or at a specified substantially constant linear velocity;

a mode controller, said controller controlling said reproduced signal processor to operate in said first processing mode when the signals to be reproduced are said first modulated coded signals and to operate in said second processing mode when the signals to be reproduced are said second modulated coded signals.

6. An apparatus according to claim 5, wherein said mode controller includes a detector, said detector detecting, from a signal reproduced by said optical reproducer, whether said modulated coded signals are said first modulated coded signals or said second modulated coded signals.

7. An apparatus according to claim 5, wherein each of said n×A2/A1 reproducing channels of said optical reproducer includes a semiconductor laser for emitting a laser beam, and a non-linear optical element for generating a second harmonic component from the laser beam, and uses the second harmonic component for reproducing each of said plural channels of modulated coded signals from said recording disk.

8. An optical disc apparatus for recording a digital signal on a recording disk in a recording mode and for reproducing the recorded digital signal in a reproduction mode, comprising:

a recording signal processor, said processor, in a first processing mode, compression-coding and modulating an input signal to obtain one channel of first modulated coded signal having a bit rate A1, and, in a second processing mode, compression-coding and modulating the input signal to obtain two channels of second modulated coded signals having a bit rate A2 higher than the bit rate A1;

a disk driver, said driver driving said recording disk to rotate at a specified substantially constant rotating speed or at a specified substantially constant linear velocity;

a mode specifier, said specifier controlling said recording signal processor in said recording mode to operate either in said first processing mode or in said second processing mode;

an optical recorder and reproducer having two recording/reproducing channels, said recorder and reproducer recording on said recording disk said one channel of first modulated coded signal through one of said two recording/reproducing channels when said recording signal processor is operating in said first processing mode and for recording said two channels of second modulated coded signals through said two recording/reproducing channels when said recording signal processor is operating in said second processing mode, and said recorder and reproducer reproducing from said recording disk said recorded one channel of first modulated coded signal through one of said two recording/reproducing channels to obtain one channel of reproduced first modulated coded signal having the bit rate A1 when said first modulated coded signal is to be reproduced and for reproducing said recorded two channels of second modulated coded signals through said two recording/reproducing channels to obtain two channels of reproduced modulated coded signals having the bit rate A2 when said second modulated coded signals are to be reproduced;

a reproduced signal processor, said processor, in a first processing mode, demodulating and decoding said one channel of reproduced first modulated coded signal to obtain a reproduced digital signal and, in a second processing mode, demodulating and decoding said two channels of reproduced second modulated coded signals to obtain another reproduced digital signal;

a mode controller, said controller controlling said reproduced signal processor so as to operate in said first operating mode said first modulated coded signal is to be reproduced and so as to operate in said second mode when said second modulated coded signals are to be reproduced.

9. An apparatus according to claim 8, wherein said mode controller includes a detector, said detector for detecting from a signal reproduced by said optical recorder and reproducer whether signals to be reproduced are said first modulated coded signals or said second modulated coded signals.

10. An apparatus according to claim 8, wherein each of said two recording/reproducing channels of said optical recorder reproducer includes a semiconductor laser, said laser emitting a laser beam, and a non-linear optical element, said element generating a second harmonic component from the laser beam, and wherein said recorder and reproducer uses the second harmonic component for reproducing each of the one channel and two channels of modulated coded signals from said recording disk.

11. An apparatus according to claim 8, wherein said mode specifier controls said recording signal so as to operate in said first processing mode when the input signal is an NTSC, PAL or SECAM signal and so as to operate in said second processing mode when the input signal is a high definition television signal having a wider frequency band than the NTSC, PAL or SECAM signal.

12. An apparatus according to claim 3, wherein said recording disk has two respective recording areas on opposite surfaces thereof, and wherein said two recording/reproducing channels of said recorder and reproducer means are arranged such that said one channel of first modulated coded signal is recorded through one of said two recording/reproducing channels in one of said two recording areas and said two channels of second modulated coded signals are recorded through said two recording/reproducing channels in both of said two recording areas.

13. An optical disk apparatus for reproducing a digital signal recorded on a recording disk in the form of either one channel of first modulated coded signal having a bit rate A1 and two channels of second modulated coded signals having a bit rate A2 higher than the bit rate A1, said apparatus comprising:

an optical reproducer, said reproducer having two reproducing channels for reproducing from said recording disk the recorded one channel first modulated coded signal through one of said two reproducing channels to obtain one channel of reproduced first modulated coded signal having the bit rate A1 when said first modulated coded signal is to be reproduced and for reproducing the recorded two channels of second modulated coded signals through said two reproducing channels to obtain two channels of reproduced modulated coded signals having the bit rate A2 when said second modulated coded signals are to be reproduced;

a reproduced signal processor, said processor, in a first processing mode, demodulating and decoding said one channel of reproduced first modulated coded signal to obtain a reproduced digital signal and, in a second processing mode, demodulating and decoding said two channels of reproduced second modulated coded signals to obtain another reproduced digital signal;

a disk driver, said driver driving said recording disk to rotate at a specified substantially constant rotating speed or at a specified substantially constant linear velocity;

a mode controller, said controller controlling said reproduced signal processor so as to operate in said first processing mode when said first modulated coded signal is to be reproduced and so as to operate in said second processing mode when said second modulated coded signals are to be reproduced.

14. An apparatus according to claim 13, wherein said mode controller includes a detector, said detector detecting from a signal reproduced by said optical reproducer whether said modulated coded signals are said first modulated coded signals or said second modulated coded signals.

15. An apparatus according to claim 13, wherein each of said two reproducing channels of said optical reproducer includes a semiconductor laser, said laser emitting a laser beam, and includes a non-linear optical element, said element generating a second harmonic component from the laser beam, and wherein said optical reproducer uses the second harmonic component for reproducing each of said one channel and two channels of modulated coded signals from said recording disk.

16. An apparatus according to claim 13, wherein said recording disk has two recording areas on opposite respective surfaces thereof, and wherein said two reproducing channels of said reproducer are arranged such that said one channel of first modulated coded signal is reproduced through one of said two reproducing channels from one of said two recording areas and said two channels of second modulated coded signals are reproduced through said two recording/reproducing channels from both of said two recording areas.

* * * * *